THOMAS WIER.
Improvement in Insect Traps.

No. 119,905. Patented Oct. 10, 1871.

Witnesses:
G. Mathys.
Thos. D. D. Durand.

Inventor:
Thomas Wier
Per
Attorneys.

UNITED STATES PATENT OFFICE.

THOMAS WIER, OF LACON, ILLINOIS.

IMPROVEMENT IN INSECT-TRAPS.

Specification forming part of Letters Patent No. 119,905, dated October 10, 1871.

*To all whom it may concern:*

Be it known that I, THOMAS WIER, of Lacon, in the county of Marshall and State of Illinois, have invented a new and Improved Insect-Trap; and I do hereby declare the following to be a full, clear, and exact description of the same, reference being had to the accompanying drawing making a part of this specification, in which—

Figure 1:
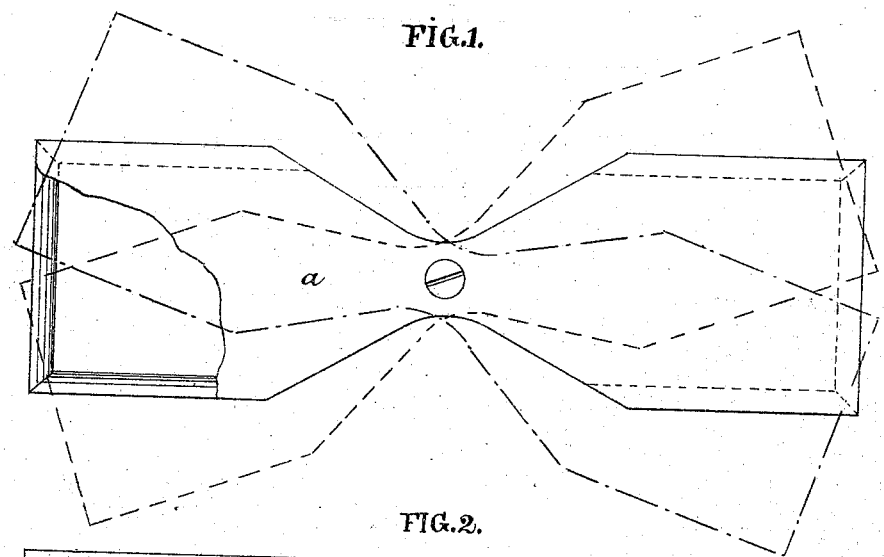
Figure 2:
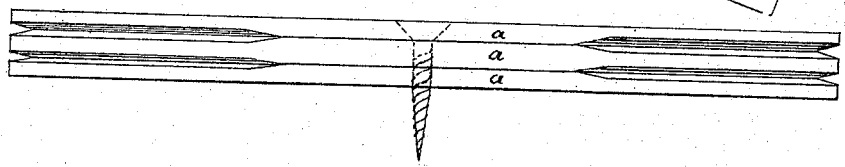
Figure 3:
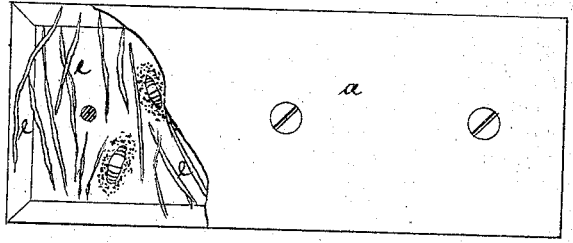
Figure 4:
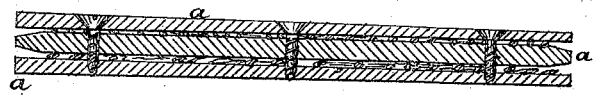
Figure 5:
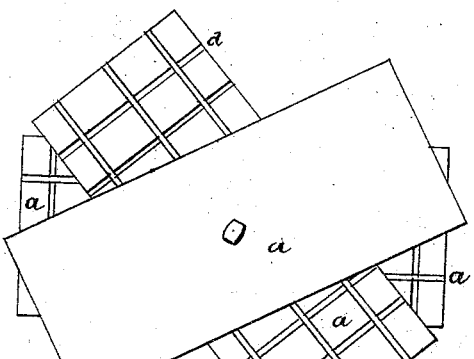

Figure 1 is a top view, and Fig. 2 a side elevation; Fig. 3 is a top view, partly in section; Fig. 4, sectional elevation; Fig. 5, top view.

This invention relates to the use of two or more pieces of wood, of any suitable form and size, fastened together and provided with grooves or slits. These pieces are designed to be placed among the branches of fruit trees, or on the ground beneath or near such trees, to serve as a trap for the larvæ of moths and other noxious insects.

Referring to the drawing, $a$ are the pieces of wood aforesaid, connected, in this instance, by a screw passed through their centers, and forming a pivot on which each may be turned separately, so as to expose any insects or larvæ that may have found shelter between them, thus enabling the operator to destroy them. One or more of these pieces may be seamed or grooved, as shown at $d$, Fig. 5, to enable the insect easily to find a way and shelter between the pieces; or, as shown in Fig. 3, straws $e$, grass, or other such material may be placed between the pieces prior to fastening them together, so as to keep them slightly apart when connected, for the same purpose as the seams aforesaid. The edges of the pieces may be beveled to accomplish the same end.

This trap is designed more especially for the destruction of apple-worms, the larvæ of the codling moth, which, when sheltered between the pieces $a$, may be easily slain by pressing the pieces together or by turning the pieces so as to uncover the larvæ.

Traps constructed in this way form agreeable hiding-places for larvæ, pupæ, or chrysales, and when placed in or near a tree, soon attract all such creatures in its vicinity. Shingles, either sawed or split, form an excellent material for the construction of the trap. The same nail or screw that connects the pieces may be used for fastening the trap to the tree.

Having thus described my invention, what I claim as new, and desire to secure by Letters Patent, is—

An insect-trap constructed of piece $a$, grooved and fastened together substantially as shown and described.

THOMAS WIER.

Witnesses:
MARK BANGS,
D. B. WIER.

(63)